United States Patent
Boggs et al.

(10) Patent No.: US 9,584,607 B2
(45) Date of Patent: Feb. 28, 2017

(54) PROVIDING CONTENT BASED ON LOCATION

(71) Applicant: Apple Inc., Cupertino, CA (US)

(72) Inventors: James Oliver Boggs, San Francisco, CA (US); Ryan Christopher Griggs, San Jose, CA (US)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 14/317,886

(22) Filed: Jun. 27, 2014

(65) Prior Publication Data

US 2015/0381746 A1 Dec. 31, 2015

(51) Int. Cl.
| | | |
|---|---|---|
| G06F 3/00 | (2006.01) | |
| H04L 29/08 | (2006.01) | |
| H04L 29/06 | (2006.01) | |
| G06F 3/0488 | (2013.01) | |
| G06F 3/0484 | (2013.01) | |

(52) U.S. Cl.
CPC ............ *H04L 67/18* (2013.01); *G06F 3/0488* (2013.01); *G06F 3/04842* (2013.01); *H04L 65/60* (2013.01)

(58) Field of Classification Search
CPC ...................................................... H04L 67/18
USPC ...................................................... 715/738
See application file for complete search history.

(56) References Cited

U.S. PATENT DOCUMENTS

| | | | | | |
|---|---|---|---|---|---|
| 7,747,982 | B1 * | 6/2010 | Sie | ..................... | H04N 7/17336 717/118 |
| 8,438,177 | B2 * | 5/2013 | Paulsen | ................. | G06F 3/0481 707/722 |
| 8,458,169 | B2 * | 6/2013 | Griggs | .............. | G06F 17/30572 707/722 |
| 8,938,488 | B1 * | 1/2015 | Sayed | ................... | H04L 9/0872 705/14.54 |
| 9,043,845 | B2 * | 5/2015 | Davis | ................... | H04N 21/458 725/62 |
| 2002/0095510 | A1 * | 7/2002 | Sie | ..................... | H04N 7/17336 709/231 |
| 2009/0031006 | A1 * | 1/2009 | Johnson | .............. | H04W 76/021 709/218 |
| 2009/0328087 | A1 * | 12/2009 | Higgins | ................. | H04N 7/173 725/10 |
| 2010/0205628 | A1 * | 8/2010 | Davis | ................ | H04M 1/72533 725/25 |
| 2010/0317370 | A1 * | 12/2010 | Feng | ....................... | H04W 4/02 455/456.3 |
| 2012/0064908 | A1 * | 3/2012 | Fox | ....................... | H04W 28/10 455/452.2 |
| 2012/0189270 | A1 * | 7/2012 | Bedingfield, Sr. | ... | H04N 5/4403 386/230 |
| 2013/0152139 | A1 * | 6/2013 | Davis | ................... | H04N 21/482 725/61 |
| 2013/0339345 | A1 * | 12/2013 | Soto Matamala | .. | G06F 17/3089 707/722 |
| 2014/0047069 | A1 * | 2/2014 | Ma | ................... | H04N 21/23439 709/218 |

(Continued)

*Primary Examiner* — William Titcomb

(74) *Attorney, Agent, or Firm* — Fish & Richardson P.C.

(57) ABSTRACT

Among other things, we describe a method that includes receiving a content stream that defines elements of media content, determining that an element of content of the content stream is associated with a first location, determining that an electronic device is at a second location proximate to the first location, and in response, making the element of content available on the electronic device.

17 Claims, 7 Drawing Sheets

(56) References Cited

U.S. PATENT DOCUMENTS

| | | | | |
|---|---|---|---|---|
| 2014/0168071 A1* | 6/2014 | Ahmed | ............ | H04N 5/23206 345/156 |
| 2014/0256361 A1* | 9/2014 | Gailey | ............ | G06F 17/30867 455/456.3 |
| 2015/0018015 A1* | 1/2015 | Clark | ............ | H04W 4/02 455/456.3 |
| 2015/0181405 A1* | 6/2015 | Dua | ............ | H04W 4/02 455/456.3 |
| 2015/0206168 A1* | 7/2015 | Boggs | ............ | G06Q 30/0241 705/14.4 |
| 2015/0237386 A1* | 8/2015 | Sheehan | ............ | H04N 21/2668 725/34 |
| 2015/0319486 A1* | 11/2015 | Wang | ............ | H04N 21/4402 725/62 |
| 2015/0358423 A1* | 12/2015 | L'Heureux | ............ | G06F 17/30 705/21 |

* cited by examiner

PROVIDING CONTENT BASED ON LOCATION

TECHNICAL FIELD

The disclosure generally relates to providing content based on a location of a user and/or an electronic device.

BACKGROUND

An electronic device can receive content such as media content from one or more sources. For example, the content may be provided by servers that communicate using a network such as the Internet. The content may be provided based on a subscription such as a "feed." A device can be subscribed to a feed, such that content posted to the feed is delivered to the device.

SUMMARY

In one aspect, in general, a method includes receiving a content stream, the content stream defining elements of media content; determining that an element of content of the content stream is associated with a first location; determining that an electronic device is at a second location proximate to the first location; and in response, making the element of content available on the electronic device. This aspect could also be implemented as a system, apparatus, or computer program product stored on a non-transitory computer-readable medium such as a computer-readable storage device.

Implementations of this aspect may include one or more of the following features. Making the element of content available on the electronic device comprises displaying, in a user interface on the electronic device, a user interface element indicating that the element of content is available. The method includes, in connection with making the element of content available on the electronic device, determining that the element of content of the content stream is associated with a first time range, and determining that the electronic device is at the second location proximate to the first location at a time within the first time range. Determining that an element of content of the content stream is associated with a first location comprises extracting data describing the first location from an entry of the content stream associated with the element of content. Determining that the electronic device is at the second location proximate to the first location comprises determining that the electronic device is at a location that is within an area defined by a radius emanating from the first location. The content stream comprises an RSS feed and the elements of media content comprise episodes of a podcast each described by entries of the RSS feed.

In one aspect, in general, a method includes receiving a content stream, the content stream defining elements of media content; determining that an element of content of the content stream is associated with a first location; determining that an electronic device is not proximate to the first location; and in response, making the element of content unavailable on the electronic device.

Implementations of this aspect may include one or more of the following features. Making the element of content unavailable on the electronic device comprises displaying, in a user interface on the electronic device, a user interface element indicating that the element of content is not available to a user of the user interface.

Particular implementations provide at least the following advantages. Content can be provided to a user based on location to give the user an incentive to visit the location. Once the user has arrived at the location, no additional action needs to be taken to provide the content.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

An episode of a podcast can be made available to a mobile device based on a location of the mobile device. A typical podcast is organized into episodes of media content, e.g., audio and/or video and/or other types of media, such as still images displayed at specified time indices of the podcast.

A podcast is sometimes defined by an RSS (Really Simple Syndication) feed. An RSS feed is a collection of tagged data that can be updated to incorporate new data when the new data becomes available. An RSS feed may be organized into entries and the feed can be updated by adding new entries to the feed. The tagged data of each entry may describe content available at another network location, for example, by including a URL among the tagged data. In this way, an RSS feed can contain data describing each episode of a podcast. When a new episode is released, the RSS feed can be updated to include an entry describing the podcast. Software that processes RSS feeds can automatically process the new data that is included in the updates and make the podcast referenced by each new entry available to an end user. An end user who receives updates to an RSS feed is sometimes referred to as a subscriber.

One or more episodes of a podcast can be designated as "bonus" episodes which are not available to all subscribers of the podcast. In contrast, "regular" episodes are available to all subscribers of a podcast. An entry of the RSS feed that describes the bonus episode can include a tag that defines a geographical area in which a user can receive the bonus episode of a podcast. For example, the geographical area could be the radius around a performance stage, so that a subscriber will receive the bonus episode if he/she attends a performance held at that stage. The tag can also include information describing conditions under which the bonus episode is provided to a subscriber. For example, the entry describing the bonus episode can also include information indicating a time at which the bonus episode can be made available when the subscriber is at the specified location (e.g., the time at which the performance is held).

Some mobile devices, such as smartphones, have one or more location systems which provide information describing a current location of the device. Accordingly, the bonus content can be made available based on the location indicated by the location system. In this way, a podcast episode can be made available to a live audience of a live event, e.g., as a reward for attending the event. No additional action such as a redeemable code or barcode scan is needed.

Figure 1:
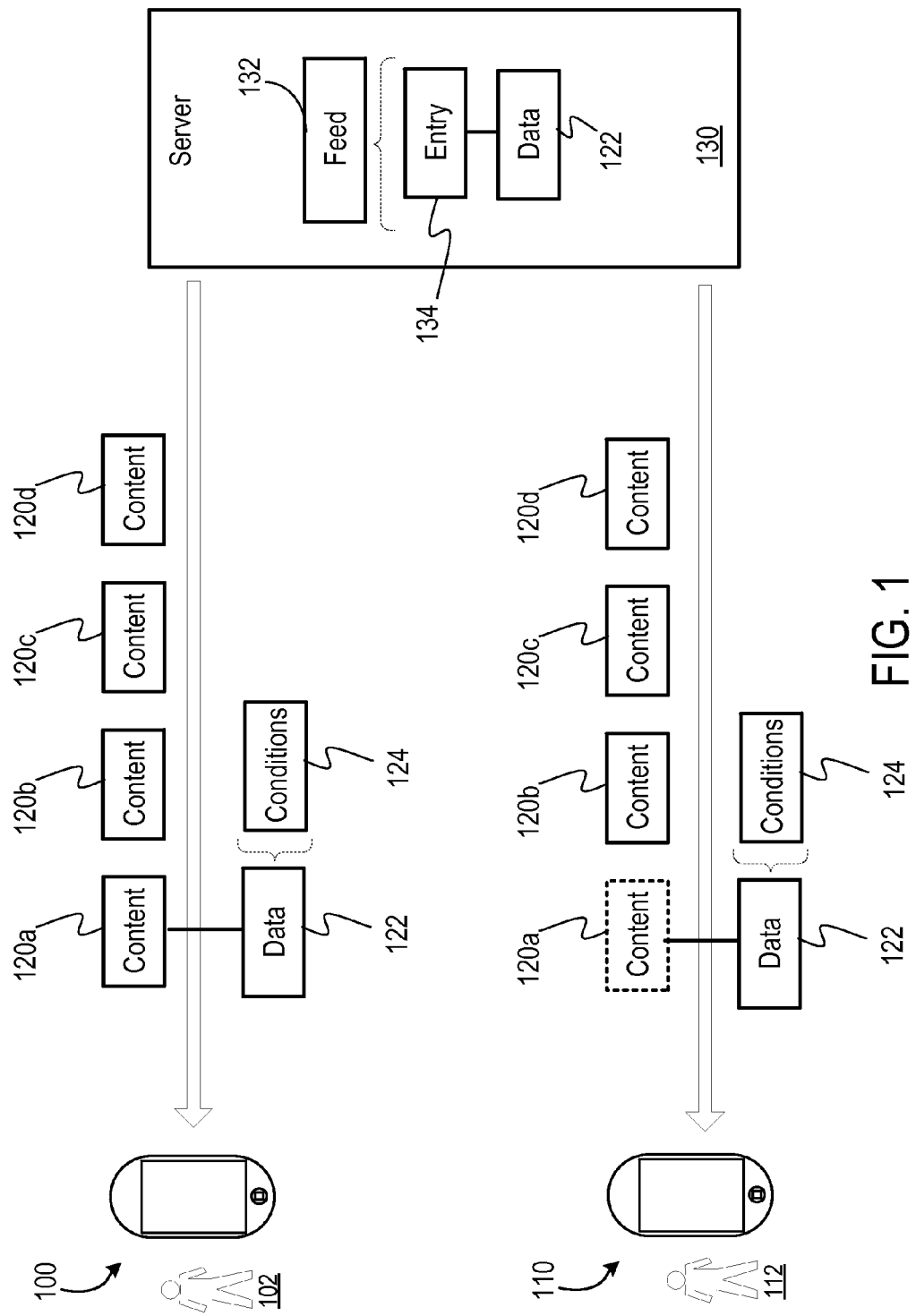
FIG. 1 is a block diagram of a mobile device and related components.

FIG. 1 shows mobile devices 100, 110 that receive content items 120a-d from a server 130. One of the content items 120a is associated with condition data 122 that indicates one or more conditions 124 under which the content item 120a may be accessed by a mobile device 100, 110. When the conditions 124 specified by the condition data 122 are met by one of the mobile devices 100, 110, the device is enabled to access the associated content item 120a.

The content items 120a-d may each include content that can be experienced by a user 102, 112 of the mobile devices 100, 110. In some implementations, the content items 120a-d may include one or more of audio, still images, video, text, and other kinds of media content. In some implementations, the content items 120a-d may be podcast episodes. A podcast episode may contain one or more kinds of media. Typically, podcast episodes relate to a particular theme or topic of a podcast. For example, episodes of a gardening podcast typically include content related to gardening, and episodes of a physical fitness podcast typically include content related to physical fitness. However, this is not a technical requirement, but rather an organizational technique for the benefit of users (e.g., the users 102, 112 of the mobile devices 100, 110). Any podcast is capable of including episodes related to any topic. Further, the content items 120a-d need not be podcast episodes, but rather could be any kind of content, e.g., any kind of media content. In some implementations, one or more of the content items 120a-d is not in the form of media content, but instead is content of a different kind. For example, one of the content items 120a-d could be electronic currency or represent a voucher or reward having monetary value.

The content items 120a-d may be associated with a content feed 132 made available by the server 130. The content feed 132 specifies information about the items of content 120a-d. For example, the content feed 132 may contain one or more entries, where each entry 134 includes information describing each content item 120a-d. For example, an entry 134 can contain information such as a title of the content item 120a-d, a network location (e.g., a URL) of the content item 120a-d, a name of an author of the content item 120a-d, a textual summary of the content item 120a-d, a publication date of the content item 120a-d, other media (e.g., one or more images such as a logo) associated with the content item 120a-d, and/or other data.

In some implementations, a content feed 132 has subscribers who receive new content items 120a-d when the new content items are made available. For example, the subscribers can be the users 102, 112 of the mobile devices 100, 110. In some implementations, the mobile devices 100, 110 are configured to monitor the content feed 132 and download new content items 120a-d when they are added to the content feed 132. In some implementations, the identities of users 102, 112 who are subscribers to a content feed 132 are known to the server 130. For example, the users 102, 112 may have subscribed to the content feed 132 by establishing a user account with the server 130 or with another entity (such as a centralized subscriber system) that communicates with the server 130. In some implementations, the identities of the subscribers need not be known to the server 130. For example, the content feed 132 may be available to anyone who can communicate with the server 130. This type of content feed is sometimes referred to as a public content feed. In this example, a user 102, 112 becomes a subscriber by instructing their respective mobile device 100, 110 to download new content items associated with the content feed 132 when the new content items become available.

In some implementations, new content items 120a-d are added to the content feed 132 when a new entry 134 is added that specifies information about the new content item 120a-d. For example, an administrator of the content feed 132 may make a new content item available to subscribers (e.g., the users 102, 112) by adding an entry 134 specifying information about the new content item. The technique of making a content item available to subscribers is sometimes referred to as "publishing" the content item.

As noted above, in some implementations, a content item 120a can be associated with condition data 122 that indicates one or more conditions 124 under which the content item 120a may be accessed by a mobile device 100, 110. The condition data 122 can be included in the content feed 132. For example, an entry 134 that belongs to the content feed 132 and specifies information about the content item 120a can include the condition data 122. The condition data 122 specifies one or more conditions that, when met, indicate that a subscriber is authorized to access a content item associated with the condition data 122. In general, a condition is met when a fact represented by the condition is true. For example, if the condition takes the form of "X=1" then the fact represented by the condition is true, and thus the condition is met, when the variable "X" is equal to the value "1."

In some implementations, the condition data 122 can specify a location. For example, the condition data 122 may indicate that a content item associated with the condition data 122 is authorized to be accessed if a subscriber's device is proximate to the specified location. This is sometimes referred to as a location condition. In some implementations, the condition data 122 can specify a time. For example, the condition data 122 may indicate that a content item associated with the condition data 122 is authorized to be accessed at the specified time (e.g., within a specified range of times). This is sometimes referred to as a time condition. In some implementations, the content item associated with the condition data 122 is authorized to be accessed when both the location and time conditions are met. In some implementations, other types of conditions are possible.

In the example shown in FIG. 1, one mobile device 100 may be at a location proximate to a location specified by the conditions 124. The entry 134 that belongs to the content feed 132 and that specifies information about a content item 120a may also include condition data 122. The condition 124 may be a location condition, which indicates that the content item 120a is authorized to be accessed by subscribers when a subscriber's electronic device is proximate to the location. For example, the condition data 122 may include a condition 124 specifying the location, e.g., in the form of longitude and latitude data. The condition data 122 may also indicate a distance relative to the location. For example, the condition data 122 may indicate a distance of two hundred meters. In this example, a determination can be made whether the mobile device 100 meets the condition 124. For example, if the mobile device 100 is within two hundred meters of the location indicated by the condition data 122, then the mobile device 100 is authorized to access the content item 120a. In contrast, another mobile device 110 may receive content items specified by the content feed 132 and is not within two hundred meters of the location indicated by the condition data 122. Thus, the mobile device 110 will not be authorized to access the content item 120*a*.

In some examples, the determination of whether the mobile device 100 meets the condition 124 may be made by the mobile device. For example, the mobile device 100 may be configured to determine its own location based on location data received from a location system of the mobile device 100. In this example, the mobile device 100 can compare its location to the location information specified by the condition data 122 to determine if it meets the location condition specified by the condition data 122. If the condition 124 specified by the condition data 122 is met, the mobile device 100 is authorized to access the content item 120*a*.

In some examples, the determination of whether the mobile device 100 meets the condition 124 may be made by a system other than the mobile device. For example, the server 130 may be configured to receive location information from the mobile device 100. In this example, the server 130 can compare the location information received from the mobile device 100 to the location information specified by the condition data 122 to determine if the mobile device 100 meets the location condition specified by the condition data 122. If the condition 124 specified by the condition data 122 is met, the mobile device 100 is authorized to access the content item 120*a*.

In some implementations, the content item 120*a* has monetary value, e.g., as a reward for meeting the conditions 124 specified by the condition data 122. For example, the content item 120*a* could be electronic currency or could take the form of a voucher redeemable for goods and services.

In some implementations, the server 130 is a single computer system, or a collection of computer systems, or a portion of a computer system, or a collection of multiple computer systems.

Figure 2A:
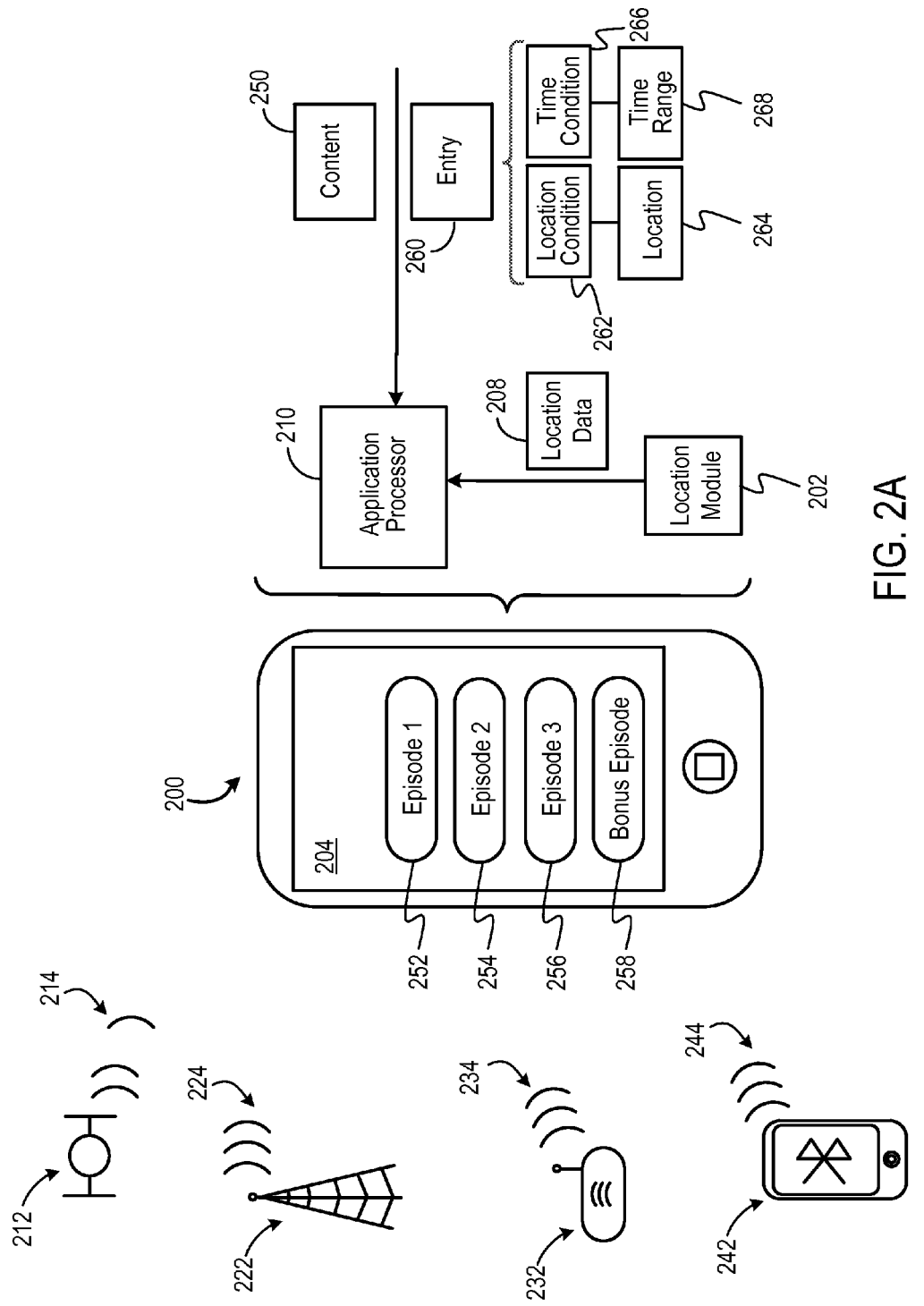
FIGS. 2A and 2B show components, modules, and user interfaces of the mobile device.

FIG. 2A shows an example of a mobile device 200 (e.g., a wireless mobile device) that runs location-aware applications. For example, the mobile device 200 could be an example of one of the mobile devices 100, 110 shown in FIG. 1. Location information used by an application executing on the mobile device 200 can be received from a location module 202 that determines a physical location of the mobile device 200, e.g., expressed as longitude and latitude. The physical location can be represented as location data 208 (e.g., expressed in the form of longitude and latitude data).

The location module 202 may include one or more physical components, such as an antenna and/or digital logic, and may also include executable code which, when executed, processes signals received by the physical components and provides data representing the signals to other components of the mobile device 200. In general, any module of the mobile device 200 may include physical components such as hardware, executable components such as software, or both.

The location module 202 may include one or more of a global navigation satellite system (GNSS) module, a cellular network-based location module, a wireless network (WiFi) location module, a Bluetooth Low-Energy short-range location module, as well as other kinds of location modules. In some implementations, the location module 202 determines location data 208 based on one or more sources of location information.

A location module 202 that includes a GNSS module determines a physical location of the mobile device by receiving data from satellites 212 orbiting the earth and calculating a location based on the received data. For example, the satellites 212 can transmit signals 214 that carry data such as timing data. The signals 214 are received and interpreted by the location module 202 to determine location data 208.

A location module 202 that includes a cellular network location module determines a physical location of the mobile device by receiving data from cellular towers 222 on the surface of earth and calculating a location based on the received data. For example, the cellular towers 222 can transmit signals 224 that carry data such as location data. The signals 224 are received and interpreted to determine location data 208.

A location module 202 that includes a wireless network location module determines a physical location of the mobile device by receiving data from wireless network routers 232 (e.g., located in buildings, outside of buildings, etc.) and calculating a location based on the received data. For example, the wireless network routers 232 can transmit signals 234 that carry data such as data identifying the individual router. The signals 234 are received and interpreted by the location module 202 to determine location data 208. In some implementations, the wireless network location module access data describing known location of wireless routers and determines the location data 208 based on a known location of the wireless network router 232.

A location module 202 that includes a short-range location module determines a physical location of the mobile device by receiving data from short-range network devices 242 and calculating a location based on the received data. In some examples, the short-range network devices 242 may be devices that support the Bluetooth Low Energy protocol, e.g., devices such as other mobile devices. For example, the short-range network devices 242 can transmit signals 244 that carry data such as data specifying the location of the short-range network device 242. The signals 244 are received and interpreted by the location module 202 to determine location data 208. In some implementations, the location module 202 determines the location data 208 based on the data specifying the location of the short-range network device 242 and based on calculating a distance between the short-range network device 242 and the mobile device 200.

In some implementations, the application processor 210 receives an entry 260 specifying information about a content item 250. For example, the entry could be part of a content feed such as the content feed 132 shown in FIG. 1, and the content item 250 could be an example of the content items 120*a-d* shown in FIG. 1. In some implementations, the entry is part of a podcast, and the content item is an episode of the podcast.

Information about content items can be displayed on a user interface 204 of the mobile device 200. For example, the user interface 204 could include user interface elements generated by an application that enables a user to access content items. The example shown in FIG. 2A includes buttons 252, 255, 256, 258 each representing a content item. A user can invoke one of the buttons 252, 255, 256, 258 (e.g., if the mobile device 200 includes a touch screen, the user can tap one of the buttons 252, 255, 256, 258) to access a corresponding content item. For example, when the user invokes one of the buttons 252, 255, 256, 258, the mobile device 200 causes playback of the corresponding content item. If the corresponding content item includes audio, the playback can include causing the audio to play through a speaker or other audio playback device. If the corresponding content item includes still images or video, the playback can include causing the still images or video to be displayed on the user interface 204.

As described above with respect to FIG. 1, content items can be made available to a user of a mobile device based on conditions associated with the content items. For example, the entry 260 shown in FIG. 2A includes data describing a location condition 262. The entry 260 may include data indicating that the content item 250 is only authorized to be accessible by a subscriber if the subscriber is proximate to a location 264 specified by the entry 260. For example, the content item 250 is authorized to be accessible on the mobile device 200 of a subscriber if the mobile device 200 of the subscriber is proximate to the location 264 specified by the entry 260.

The proximity of the mobile device 200 to the location 264 specified by the entry 260 can be determined based on location data 208 received from the location module 202. For example, the location data 208 can be received by an application processor 210. The application processor 210 can compare the location data 208 to the location 264 specified by the entry 260 to determine a distance between the two locations. If the distance between the two locations is less than a specified threshold (e.g., a specified by the location condition 262), then the mobile device 200 is proximate to the location 264. In some implementations, an entity other than the application processor 210 makes the determination of whether the mobile device 200 is proximate to the location 264 specified by the entry 260. For example, the determination could be made by a system other than the mobile device 200, e.g., could be made by the server 130 shown in FIG. 1.

If the mobile device 200 is determined to be proximate to the location 264, then a content item 250 associated with the entry 260 can be made available on the mobile device 200. For example, the content item 250 can be made available by making active a button 258 associated with the content item 250. In some implementations, the application processor 210 can make the button 258 active by displaying the button as having an "active" state and enabling the button 258 to be invoked in the user interface 204.

Figure 2B:
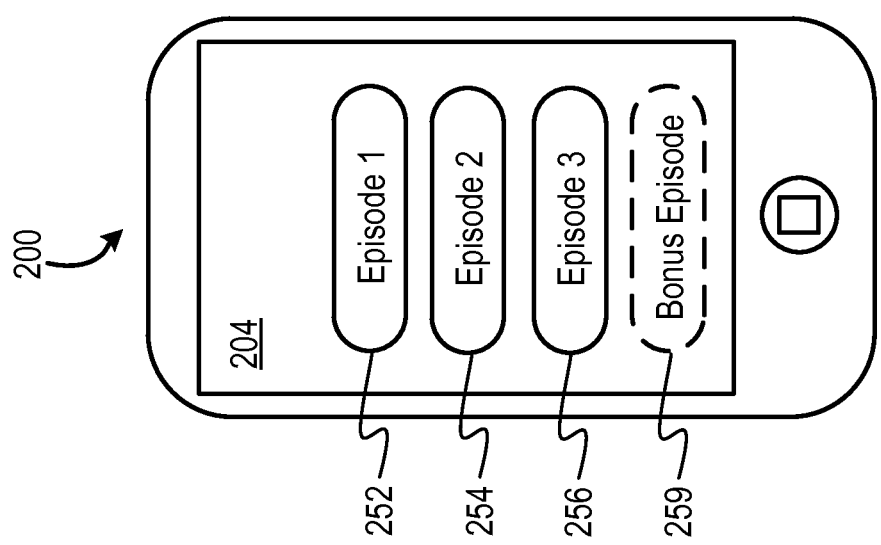

In contrast, as shown in FIG. 2B, if the mobile device 200 is determined to not be proximate to the location 264, the content item 250 associated with the entry 260 can be made unavailable on the mobile device 200. For example, the content item 250 can be made unavailable by deactivating a button 259 associated with the content item 250. In some implementations, the application processor 210 can deactivate the button 259 by displaying the button as having an "unavailable" state and disabling the button 259 from being invoked in the user interface 204. Here, the "unavailable" state is indicated by a dotted line in the deactivated button 259.

In some implementations, the entry 260 of the content feed 250 may specify other conditions. For example, the entry may specify a time condition 266. The time condition 266 may indicate that a content item may not be made available unless a current time is within a specified time range 268. For example, the mobile device 200 may have a clock module that indicates a current time. In some implementations, the content item is made available if both the location condition 262 and the time condition 266 are met. For example, the content item 250 may be "bonus" content associated with an event held at the specified location. The "bonus" content item 250 could be made available to content feed subscribers who attend the event. The location 264 could be the location of the event, e.g., the latitude and longitude of a music venue such as Madison Square Garden. The time range 268 could be the start and end time of the event, e.g., 9 P.M. to 12 A.M. on Apr. 2, 2011. In this way, if the mobile device 200 is present at the location 264 during the time range 268, then the content item 250 will be made available for playback.

An example of the entry 260 is shown below. In this example, "itunes:area" is a tag that represents a location condition 262 and a time condition 266. The tag specifies a location 264 and a time range 268.

```
<item>
<itunes:area lat="37.19.8.1156" Long "–122.3.7.4334" radius="250" date="Sun, 15 Jun 2014
19:30:00 GMT to Wed, 15 Jun 2014 21:30:00 GMT" hide />
<title>Shake Shake Shake Your Spices Bonus Episode</title>
<itunes:author>John Doe</itunes:author>
<itunes:subtitle>A short primer on table spices</itunes:subtitle>
<itunes:summary>Thanks for being a loyal fan who went to our live show! In this bonus
episode we talk about salt and pepper shakers, comparing and contrasting pour rates,
construction materials, and overall aesthetics. Come and join the party!</itunes:summary>
<itunes:image
href='http://example.com/podcasts/everything/AllAboutEverything/Episode1.jpg' />
<enclosure url='http://example.com/podcasts/everything/AllAboutEverythingEpisode3.m4a'
length='8727310' type='audio/x-m4a' />
<guid>http://example.com/podcasts/archive/aae20050615.m4a</guid>
<pubDate>Wed, 15 Jun 2005 19:00:00 GMT</pubDate>
<itunes:duration>27:04</itunes:duration>
</item>
```

Figure 3:
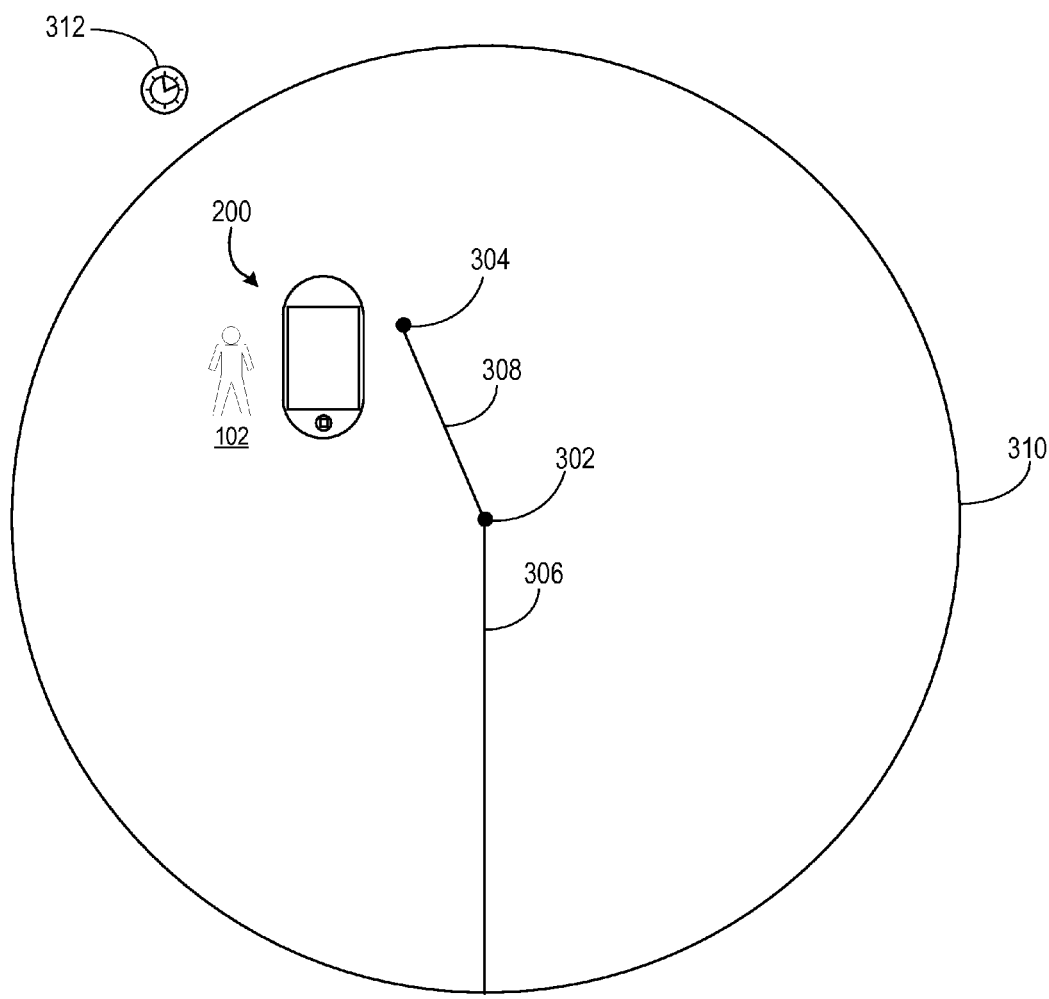
FIG. 3 represents an example technique for determining whether a location condition is met.

FIG. 3 shows an example technique for determining if a mobile device 200 is proximate to a location 302 specified by an entry of a content feed. For example, the location 302 could be an example of the location 264 shown in FIG. 2A. A location condition (e.g., the location condition 262 shown in FIG. 2A) may specify a maximum distance 306 from the location 302. For example, the location condition may be met if a mobile device 200 is determined to be located a distance from the location 302 less than the specified maximum distance 306. In this example, in contrast, the location condition is not met if the mobile device 200 is determined to be located a distance from the location 302 greater than the specified maximum distance 306. Here, the mobile device 200 has a location 304 that is a distance 308 less than the specified maximum distance 306. Put another way, mobile device 200 has a location 304 that is within an area 310 specified by a radius defined by the maximum distance 306 and a center specified by the location 302 associated with the location condition. Thus, in the example shown in FIG. 3, the location condition is met. Thus, the content item associated with the location condition can be made available to a user 102 of the mobile device 200. In some examples, the content item associated with the location condition can be made available to a user 102 of the mobile device 200 if other conditions (e.g., a time condition 312) associated with the content item are also met.

Figure 4A:
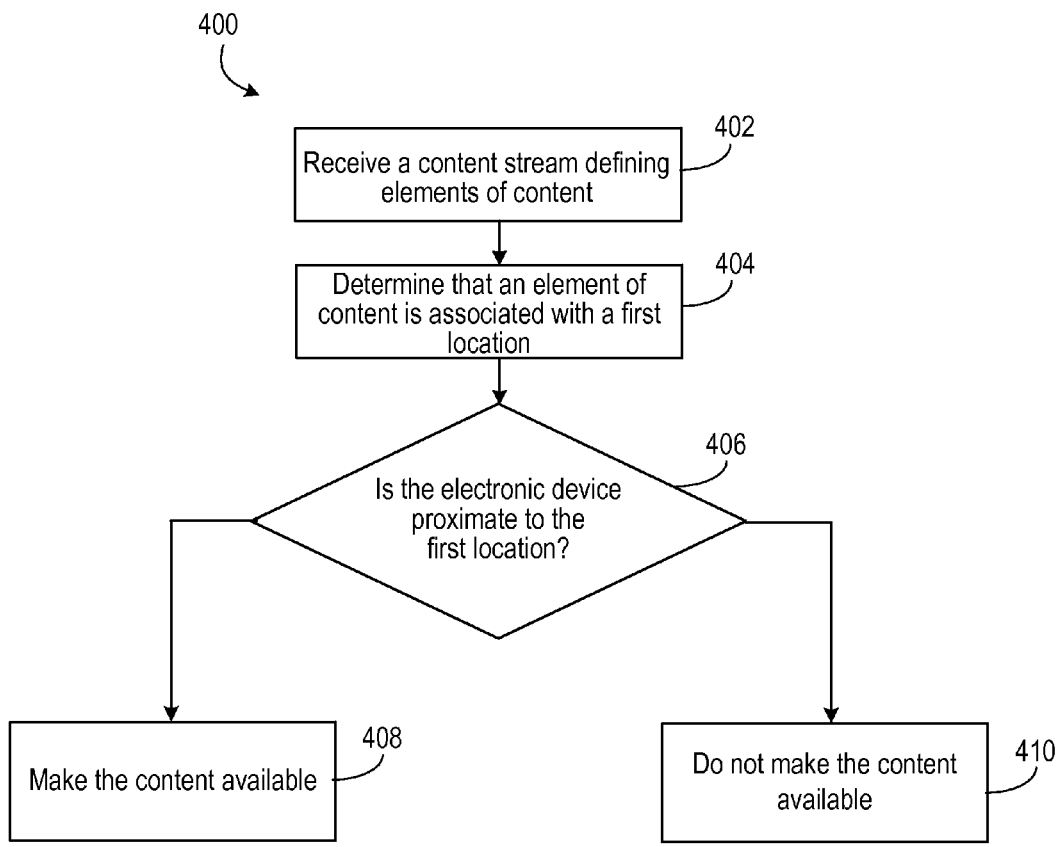
FIGS. 4A and 4B are flowcharts of exemplary processes of determining whether to make content available on the mobile device.

FIG. 4A is flow diagram of an exemplary process 400 for determining if content should be made available to a subscriber of a content feed. The process 400 can be performed, for example, by one or more modules of the mobile device 200 shown in FIG. 2A, e.g., by the application processor 210 shown in FIG. 2A. In some examples, the process 400 could be carried out by executing instructions stored on a non-transitory computer readable medium such as a computer readable storage device.

A content stream is received (402). The content stream defines elements of media content. For example, the content stream could be the content feed 132 shown in FIG. 1. The elements of media content could be the content items 120a-d shown in FIG. 1. In some implementations, the content stream comprises an RSS feed and the elements of media content comprise episodes of a podcast each described by entries of the RSS feed.

An element of content of the content stream is determined to be associated with a first location (404). For example, the first location could be the location 264 defined by the entry 260 shown in FIG. 2A. In some implementations, data describing the first location is extracted from an entry of the content stream associated with the element of content. For example, the first location could be specified by the location 264 of the entry 260 shown in FIG. 2A.

A determination is made as to whether the mobile device is at a second location proximate to the first location (406). For example, the second location could be a location defined by the location data 208 shown in FIG. 2A. In some implementations, the electronic device is determined to be at a location that is within an area defined by a radius emanating from the first location. An example of the area 310 is shown in FIG. 3.

If the electronic device is determined to be at a second location proximate to the first location, the element of media content can be made available (408). For example, a user interface element indicating that the element of content is available can be displayed in a user interface on the electronic device. FIG. 2A shows an example of a button 258 displayed in a user interface 204. The button 258 corresponds to an element of media content that is available.

If the electronic device is determined to be at a second location proximate to the first location, the element of media content is not made available (410). For example, a user interface element indicating that the element of content is not available to a user of the electronic device is displayed in a user interface on the electronic device. An example of a user interface element indicating that an element of content is not available is the button 259 shown in FIG. 2B.

In some implementations, the process 400 includes determining that the element of content of the content stream is associated with a first time range, and determining that the electronic device is at the second location proximate to the first location at a time within the first time range. In this way, the element of content is only made available if the electronic device meets both a location condition and a time condition.

Figure 4B:
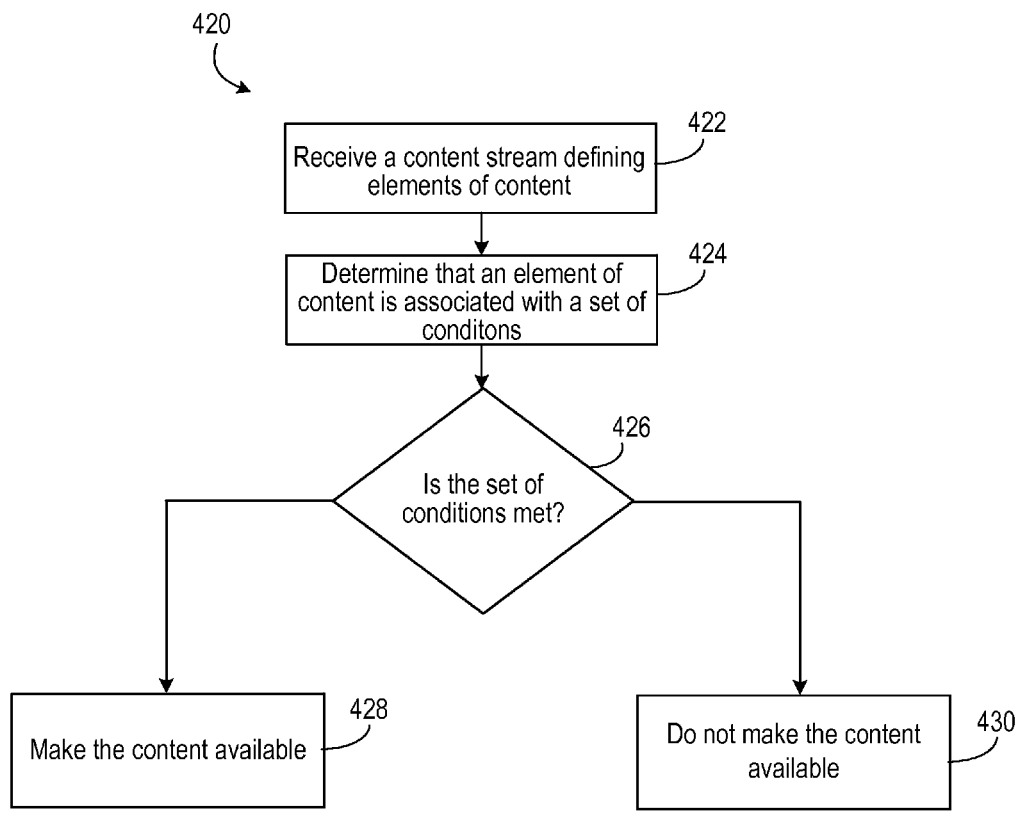

FIG. 4B is another flow diagram of an exemplary process 420 for determining if content should be made available to a subscriber of a content feed. The process 420 can be performed, for example, by one or more modules of the mobile device 200 shown in FIG. 2A, e.g., by the application processor 210 shown in FIG. 2A. In some examples, the process 400 could be carried out by executing instructions stored on a non-transitory computer readable medium such as a computer readable storage device.

A content stream is received (422). The content stream defines elements of content. For example, the content stream could be the content feed 132 shown in FIG. 1. The elements of content could be the content items 120a-d shown in FIG. 1. In some implementations, the content stream comprises an RSS feed and the elements of content comprise episodes of a podcast each described by entries of the RSS feed.

An element of content of the content stream is determined to be associated with a set of conditions (424). In some implementations, data describing the set of conditions is extracted from an entry of the content stream associated with the element of content. In some implementations, the conditions 124 shown in FIG. 1 could be an example of the set of conditions. The set of conditions could take any of a number of forms. In general, one or more of the specified conditions must be met for an action to occur, e.g., to make the element of content available on a mobile device.

For example, one of the conditions could be a location condition, such that the element of content is only made available when the mobile device is at a location specified by data associated with the location condition. In some implementations, multiple location conditions may be specified. For example, the conditions may be met when the mobile device has been at multiple specified locations. This technique may be informally referred to as a "scavenger hunt," in which a user of the mobile device is rewarded for visiting multiple locations. In some implementations, the location condition may be evaluated according to activities of more than one mobile device. For example, the location condition may be met if multiple mobile devices (e.g., the mobile devices 100, 110 shown in FIG. 1) are at a location specified by data associated with the location condition. In this way, a content item may be provided to one or more of the users of the mobile devices 100, 110 as a reward for drawing other users to the specified location.

In some implementations, one of the conditions could be a time condition. For example, the element of content may be made available at a time within a time range specified by data associated with the location condition.

In some implementations, one of the conditions may be a sharing condition. For example, one of the conditions may be met if a user of a mobile device has shared one or more elements of content with other users and/or devices. In this way, a user of the mobile device is rewarded for sharing content.

In some implementations, one of the conditions could be a ticket condition. A ticket condition specifies that an element of content is only made available when the mobile device has access to an event ticket. For example, the mobile device may include data storage that is configured to store one or more electronic tickets. Further, a ticket condition could be associated with a location condition. For example, the conditions may specify that a content item is made available to a user who both travels to an event at the specified location and also has purchased a ticket to the event.

A determination is made as to whether the mobile device meets the set of conditions (426). In some implementations, the set of conditions are met when at least one condition of the set is met. In some implementations, the set of conditions are met when a subset of the conditions are met. For example, the set of conditions may be met when 50% of the conditions are met. In some implementations, some conditions are mandatory (e.g., must be met for the set of conditions are met). In some implementations, some conditions are optional (e.g., three out of five optional conditions must be met for the set of conditions to be met). In some implementations, all of the conditions are mandatory and all of the conditions must be met for the set of conditions to be met.

If the conditions are determined to be met, the element of media content can be made available (428). For example, a user interface element indicating that the element of content is available can be displayed in a user interface on the electronic device. FIG. 2A shows an example of a button 258 displayed in a user interface 204. The button 258 corresponds to an element of content that is available.

If the conditions are determined to not be met, the element of media content is not made available (430). For example, a user interface element indicating that the element of content is not available to a user of the electronic device is displayed in a user interface on the electronic device. An example of a user interface element indicating that an element of content is not available is the button 259 shown in FIG. 2B.

Figure 5:
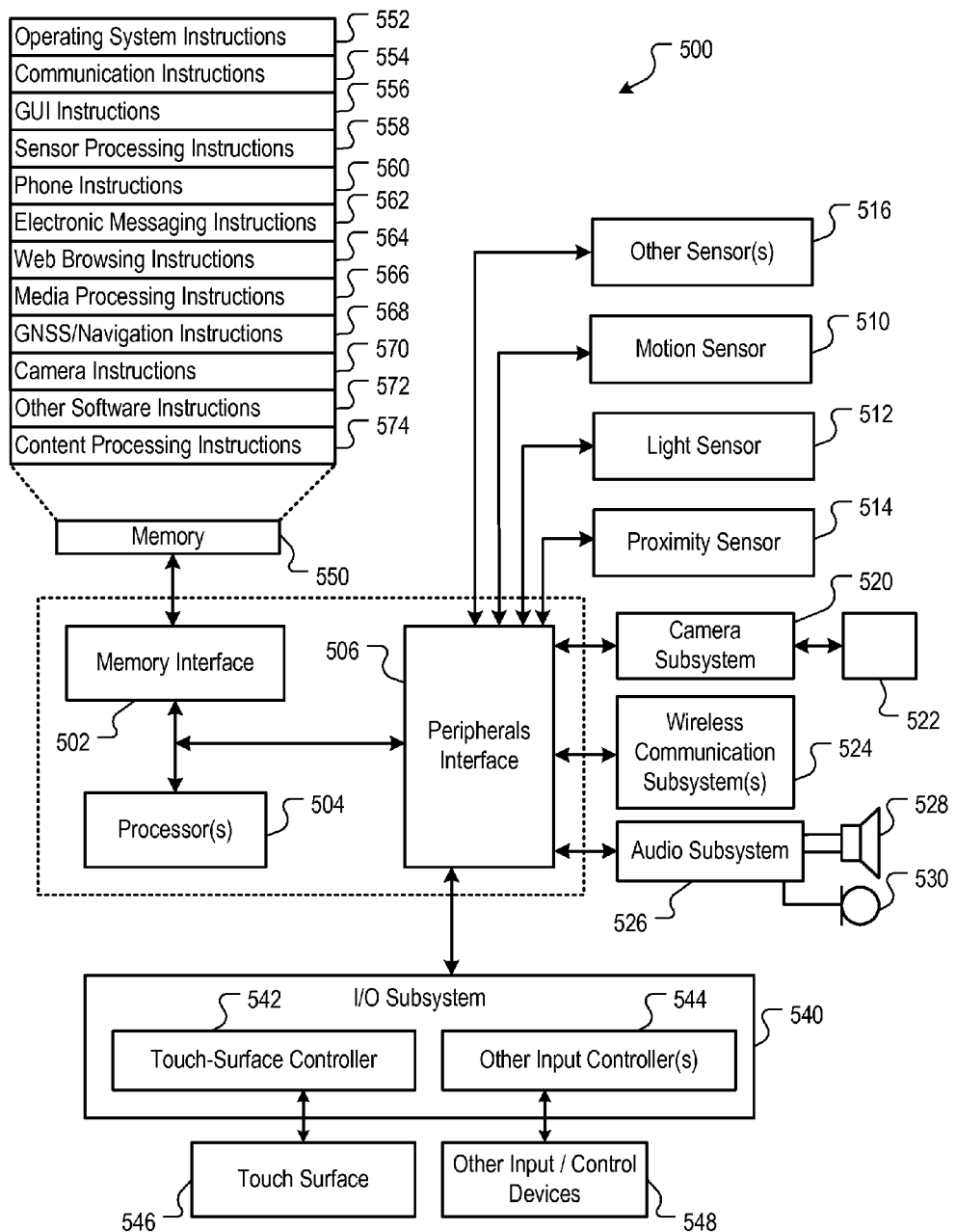
FIG. 5 is a block diagram of an exemplary system architecture implementing the features and processes of FIGS. 1-4.

FIG. 5 is a block diagram of an example computing device 500 that can implement the features and processes of FIGS. 1-4B. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GNSS receiver), a temperature sensor, a biometric sensor, or other sensing device, to facilitate related functionalities. In some examples, the motion sensor 510 is an accelerometer. For example, the motion sensor 510 may detect acceleration of the computing device 500, speed of motion of the computing device 500, and other values indicative of the movement of the computing device 500.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 500 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication. In some implementations, audio recorded by the audio subsystem 526 is transmitted to an external resource for processing. For example, voice commands recorded by the audio subsystem 626 may be transmitted to a network resource such as a network server which performs voice recognition on the voice commands.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the security lockout and voice authentication features. Operating system 552 can implement the voiceprint and voice authentication features.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the security and/or authentication processes and functions. For example, the software instructions can include instructions for performing voice authentication on a per application or per feature basis and for allowing a user to configure authentication requirements of each application or feature available on device 500.

In some implementations, the memory 550 stores content item processing instructions 574. For example, the content item processing instructions 574 can be used to determine if an element of content should be made available on the device 500. An example of these techniques are shown in FIGS. 1-4B.

The memory 550 can also store other software instructions (not shown), such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims. For example, rather than disabling a location system, the mobile device can disable or pause a location application running on the mobile device based on an indication that an activity associated with the location application (e.g., running or driving in an automobile) is no longer taking place.

What is claimed is:

1. A method comprising:
   receiving a content stream, the content stream defining elements of media content;
   determining that an element of content of the content stream is associated with a first location and a first time range, wherein the first time range represents a time at which an event is scheduled to occur and the first location corresponds to a location at which the event is scheduled to occur;
   identifying a location of an electronic device and a time at which the electronic device is at the identified location;
   determining that the identified location of the electronic device is proximate to the first location and the identified time is within the first time range; and
   in response to determining that the identified location of the electronic device is proximate to the first location and the identified time is within the first time range, making the element of content available on the electronic device.

2. The method of claim 1 wherein making the element of content available on the electronic device comprises displaying, in a user interface on the electronic device, a user interface element indicating that the element of content is available.

3. The method of claim 1 wherein determining that an element of content of the content stream is associated with a first location comprises extracting data describing the first location from an entry of the content stream associated with the element of content.

4. The method of claim 1 wherein determining that the identified location of the electronic device is proximate to the first location comprises
   determining that the identified location of the electronic device is within a predetermined distance of the first location.

5. The method of claim 1 wherein the content stream comprises an RSS feed and the elements of media content comprise episodes of a podcast each described by entries of the RSS feed.

6. A method comprising:
   receiving a content stream, the content stream defining elements of media content;
   determining that an element of content of the content stream is associated with a first location and a first time range, wherein the first time range represents a time at which an event is scheduled to occur and the first location corresponds to a location at which the event is scheduled to occur;
   identifying a location of an electronic device and a time at which the electronic device is at the identified location;
   determining one or both of: i) that the identified location of the electronic device is not proximate to the first location, and ii) that the identified time is not within the first time range; and
   in response to determining one or both of i) and ii), making the element of content unavailable on the electronic device.

7. The method of claim 6 wherein making the element of content unavailable on the electronic device comprises displaying, in a user interface on the electronic device, a user interface element indicating that the element of content is not available to a user of the user interface.

8. A computer program product stored on a storage device and configured to cause an electronic device to perform operations comprising:

receiving a content stream, the content stream defining elements of media content;

determining that an element of content of the content stream is associated with a first location and a first time range, wherein the first time range represents a time at which an event is scheduled to occur and the first location corresponds to a location at which the event is scheduled to occur;

identifying a location of an electronic device and a time at which the electronic device is at the identified location;

determining that the identified location of the electronic device is proximate to the first location and the identified time is within the first time range; and in response to determining that the identified location of the electronic device is proximate to the first location and the identified time is within the first time range, making the element of content available on the electronic device.

9. The computer program product of claim 8 wherein making the element of content available on the electronic device comprises displaying, in a user interface on the electronic device, a user interface element indicating that the element of content is available.

10. The computer program product of claim 8 wherein determining that an element of content of the content stream is associated with a first location comprises extracting data describing the first location from an entry of the content stream associated with the element of content.

11. The computer program product of claim 8 wherein determining that the identified location of the electronic device is proximate to the first location comprises
determining that the identified location of the electronic device is within a predetermined distance of the first location.

12. The computer program product of claim 8 wherein the content stream comprises an RSS feed and the elements of media content comprise episodes of a podcast each described by entries of the RSS feed.

13. An electronic device comprising:
a first location system configured to determine a current location of the electronic device;
one or more processors configured for operations comprising:
receiving a content stream, the content stream defining elements of media content;

determining that an element of content of the content stream is associated with a first location and a first time range, wherein the first time range represents a time at which an event is scheduled to occur and the first location corresponds to a location at which the event is scheduled to occur;

identifying the current location of the electronic device and a time at which the electronic device is at the identified current location;

determining that the identified current location of the electronic device is proximate to the first location and the identified time is within the first time range; and in response to determining that the identified current location of the electronic device is proximate to the first location and the identified time is within the first time range, making the element of content available on the electronic device.

14. The electronic device of claim 13 wherein making the element of content available on the electronic device comprises displaying, in a user interface on the electronic device, a user interface element indicating that the element of content is available.

15. The electronic device of claim 13 wherein determining that an element of content of the content stream is associated with a first location comprises extracting data describing the first location from an entry of the content stream associated with the element of content.

16. The electronic device of claim 13 wherein determining that the identified current location of the electronic device is proximate to the first location comprises
determining that the identified current location of the electronic device is within a predetermined distance of the first location.

17. The electronic device of claim 13 wherein the content stream comprises an RSS feed and the elements of media content comprise episodes of a podcast each described by entries of the RSS feed.

* * * * *